No. 638,988. Patented Dec. 12, 1899.
T. L. REGESTER.
AUTOMATIC CHECK ROW WIRE MACHINE.
(Application filed Sept. 2, 1898.)
(No Model.) 8 Sheets—Sheet 1.

No. 638,988. Patented Dec. 12, 1899.
T. L. REGESTER.
AUTOMATIC CHECK ROW WIRE MACHINE.
(Application filed Sept. 2, 1898.)

(No Model.) 8 Sheets—Sheet 2.

Witnesses,
Inventor,
Thomas Lyle Regester,
By Offield, Towle & Linthicum,
Atty's.

No. 638,988. Patented Dec. 12, 1899.
T. L. REGESTER.
AUTOMATIC CHECK ROW WIRE MACHINE.
(Application filed Sept. 2, 1898.)
(No Model.) 8 Sheets—Sheet 3.
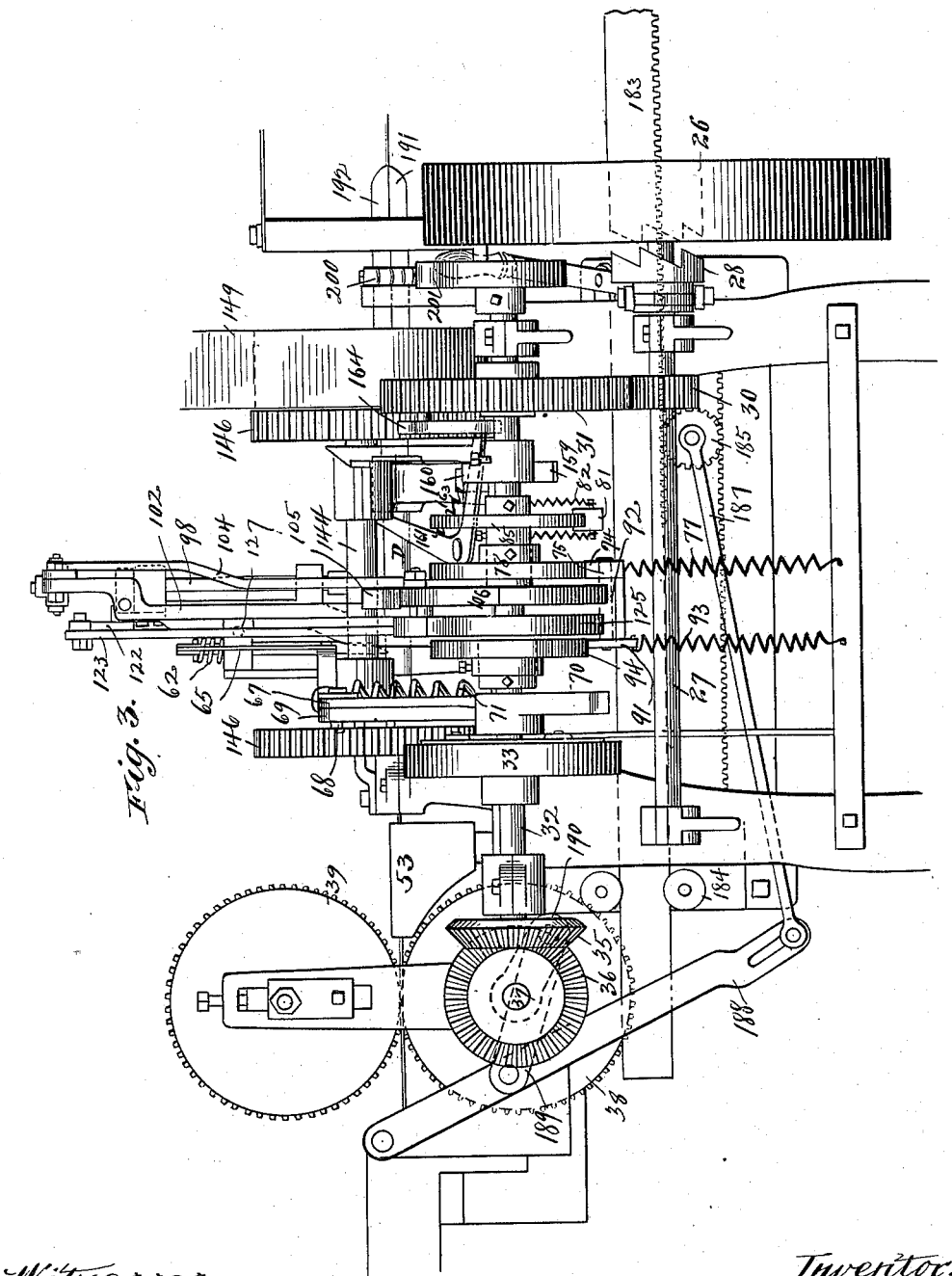
Witnesses,
Inventor,
Thomas Lyle Regester,
By Offield, Towle & Linthicum,
Attys.

No. 638,988.  
T. L. REGESTER.  
AUTOMATIC CHECK ROW WIRE MACHINE.  
(Application filed Sept. 2, 1898.)  
Patented Dec. 12, 1899.
(No Model.)  
8 Sheets—Sheet 4.
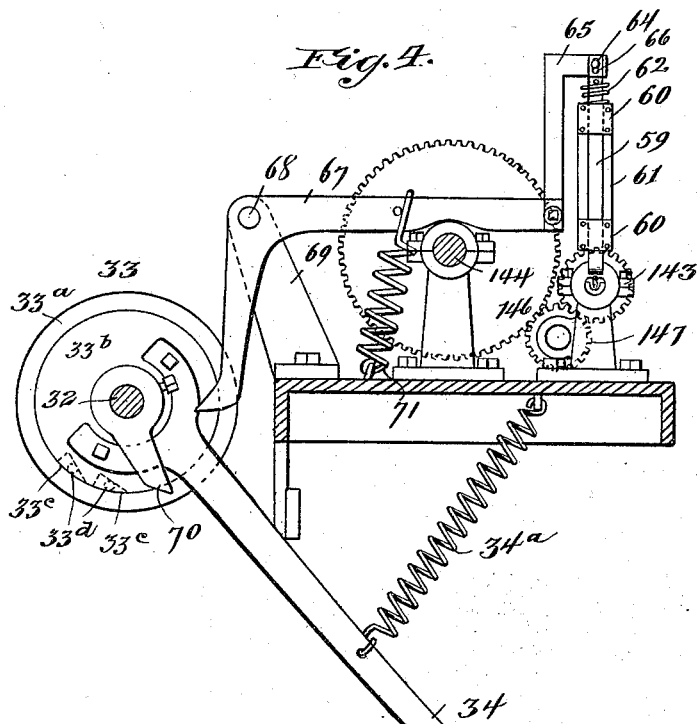
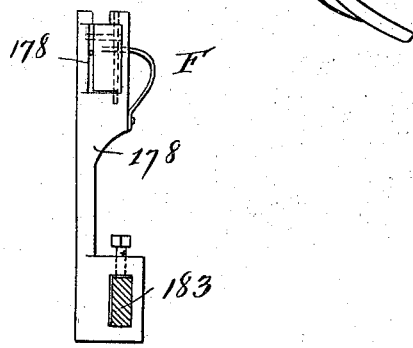
Witnesses,
Inventor,
Thomas Lyle Regester,
By Offield, Towle & Linthicum
Attys.

No. 638,988. Patented Dec. 12, 1899.
T. L. REGESTER.
AUTOMATIC CHECK ROW WIRE MACHINE.
(Application filed Sept. 2, 1898.)
(No Model.) 8 Sheets—Sheet 5.
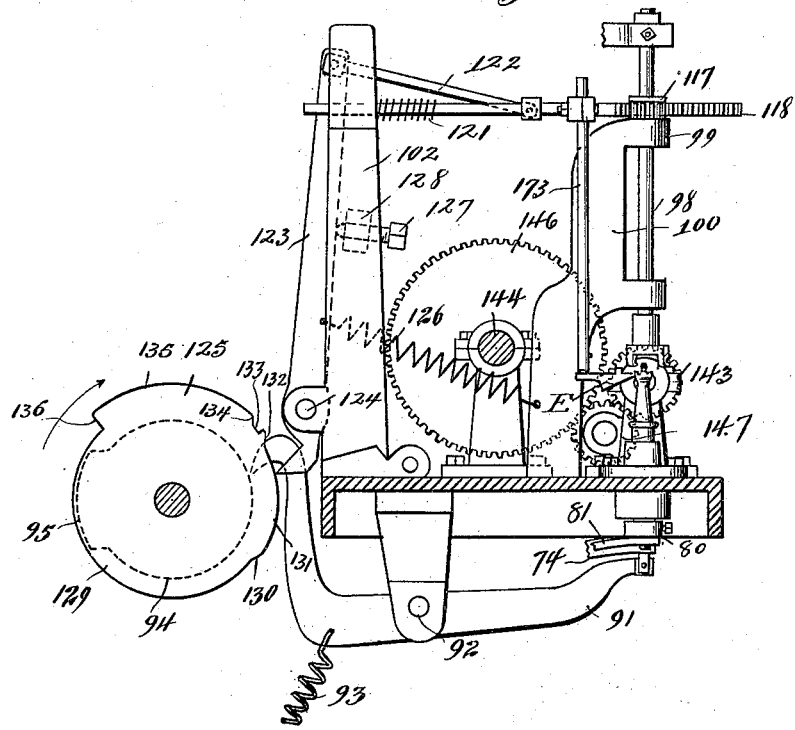
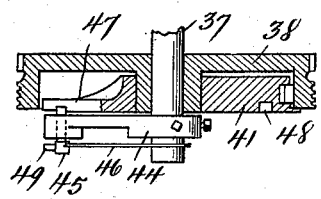

No. 638,988. Patented Dec. 12, 1899.
T. L. REGESTER.
AUTOMATIC CHECK ROW WIRE MACHINE.
(Application filed Sept. 2, 1898.)
(No Model.) 8 Sheets—Sheet 6.
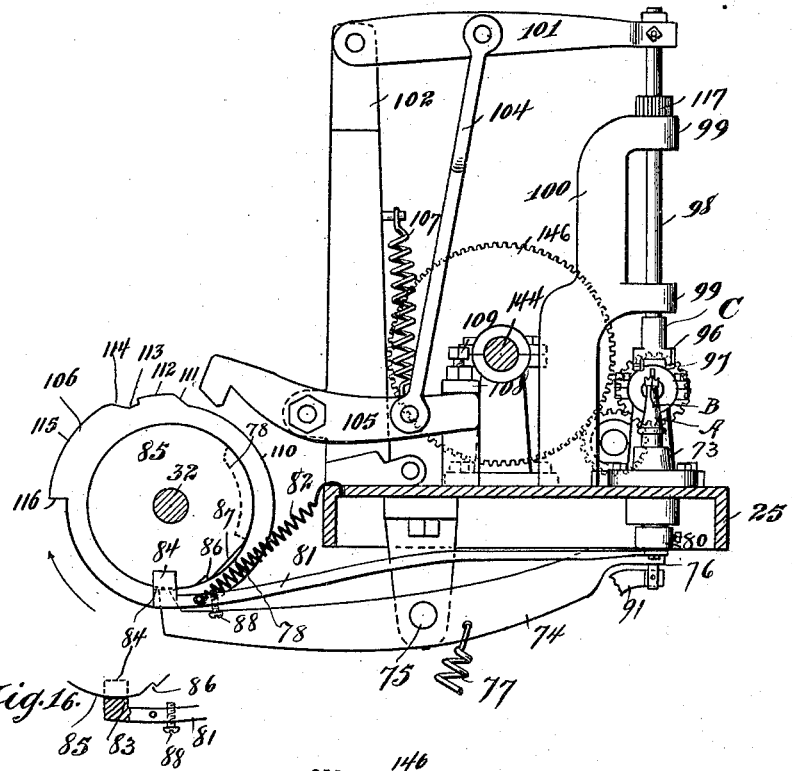
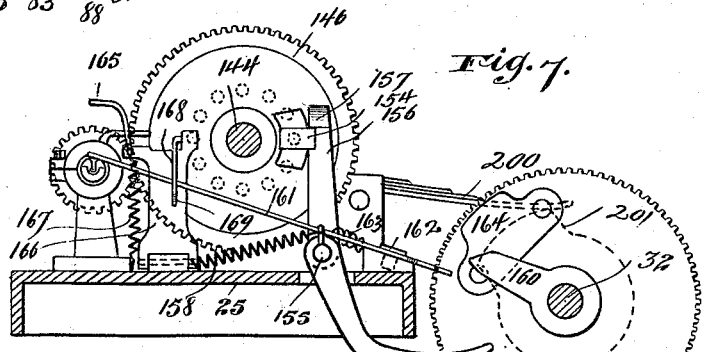
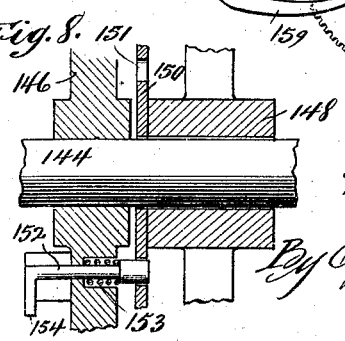
Witnesses,
Inventor;
Thomas Lyle Regester,
By Offield, Towle & Linthicum,
Att'ys.

No. 638,988. Patented Dec. 12, 1899.
T. L. REGESTER.
AUTOMATIC CHECK ROW WIRE MACHINE.
(Application filed Sept. 2, 1898.)
(No Model.) 8 Sheets—Sheet 7.
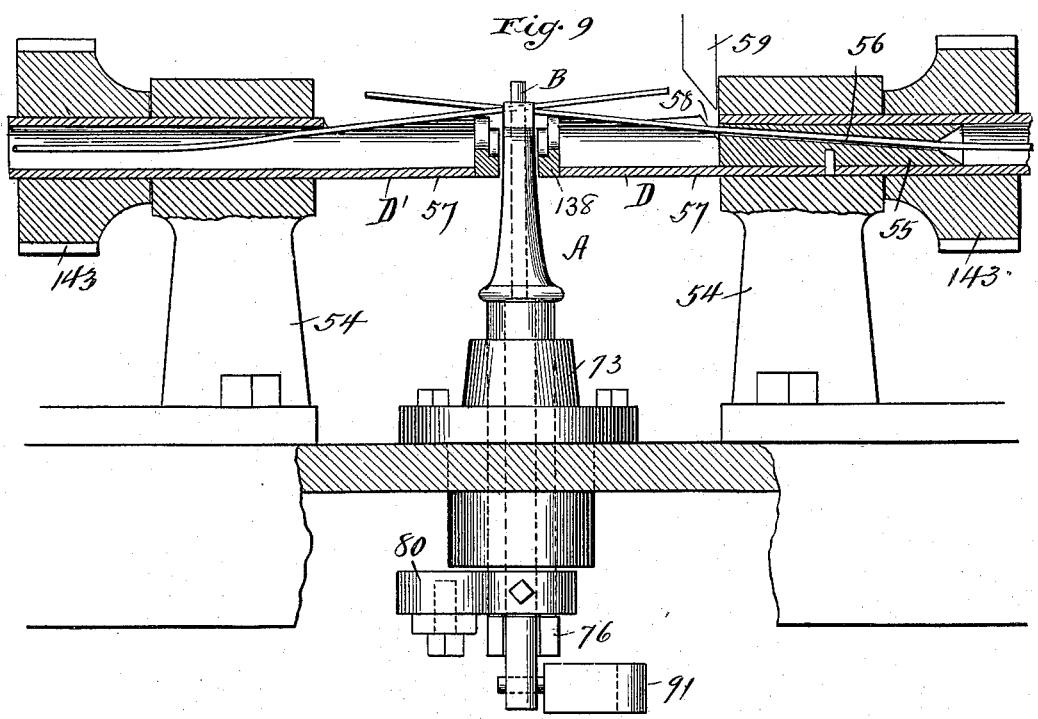
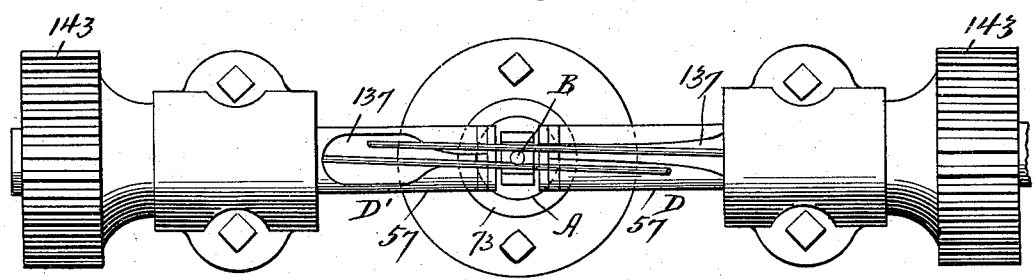

No. 638,988. Patented Dec. 12, 1899.
T. L. REGESTER.
AUTOMATIC CHECK ROW WIRE MACHINE.
(Application filed Sept. 2, 1898.)
(No Model.) 8 Sheets—Sheet 8.
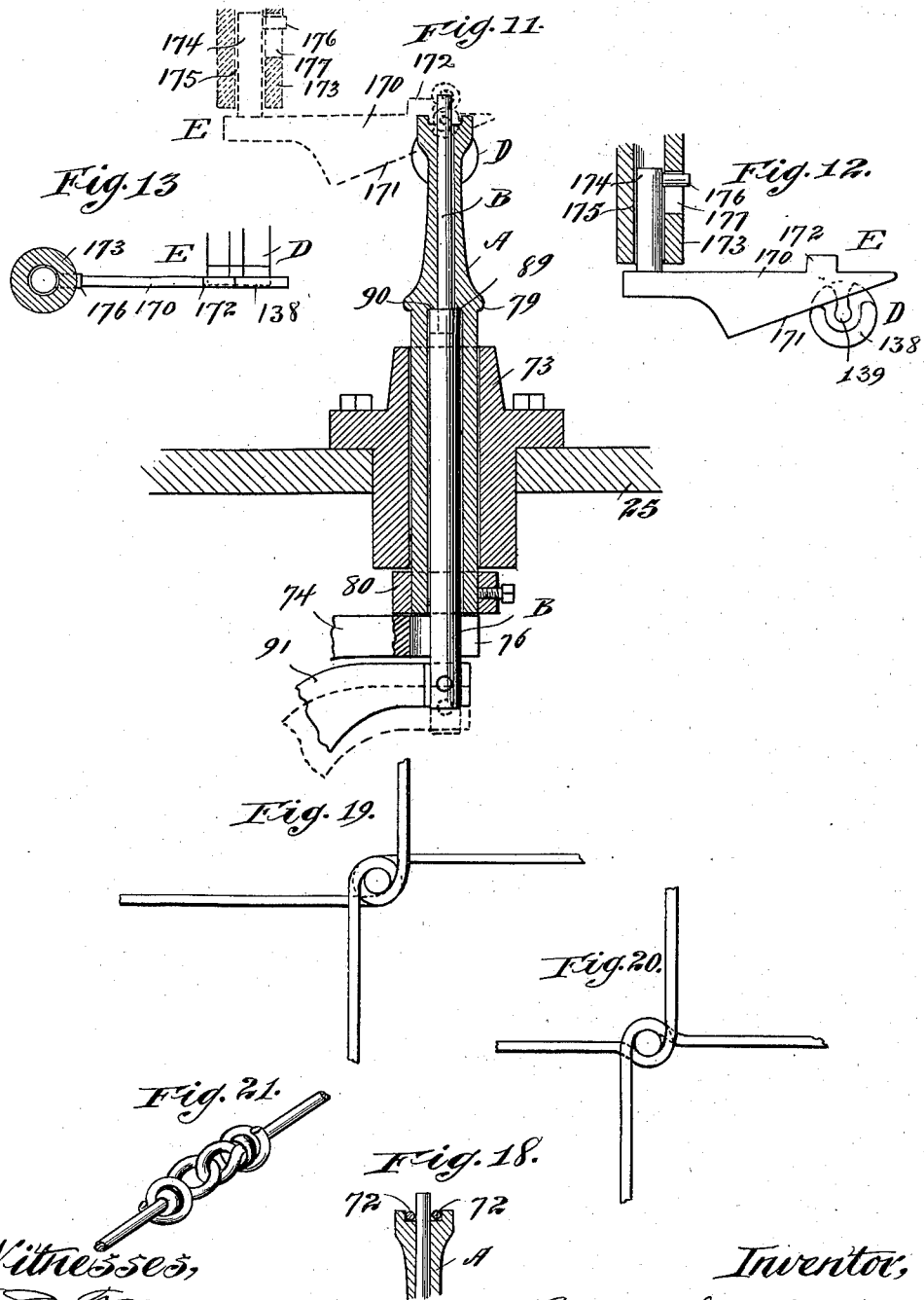
Witnesses,
Inventor,
Thomas Lyle Regester,
By Offield, Towle & Linthicum,
Attys.

UNITED STATES PATENT OFFICE.

THOMAS LYLE REGESTER, OF ROCK ISLAND, ILLINOIS, ASSIGNOR TO THE ROCK ISLAND PLOW COMPANY, OF SAME PLACE.

AUTOMATIC CHECK-ROW-WIRE MACHINE.

SPECIFICATION forming part of Letters Patent No. 638,988, dated December 12, 1899.

Application filed September 2, 1898. Serial No. 690,081. (No model.)

*To all whom it may concern:*

Be it known that I, THOMAS LYLE REGESTER, of Rock Island, in the county of Rock Island and State of Illinois, have invented certain new and useful Improvements in Automatic Check-Row-Wire Machines, of which the following is a specification.

This invention relates to machines for making check-row wire, and has for its object to provide a machine which shall be automatic in its action and of superior efficiency; and to these ends the invention consists in the matters and things hereinafter set forth, and specifically pointed out in the claims.

Figure 1:
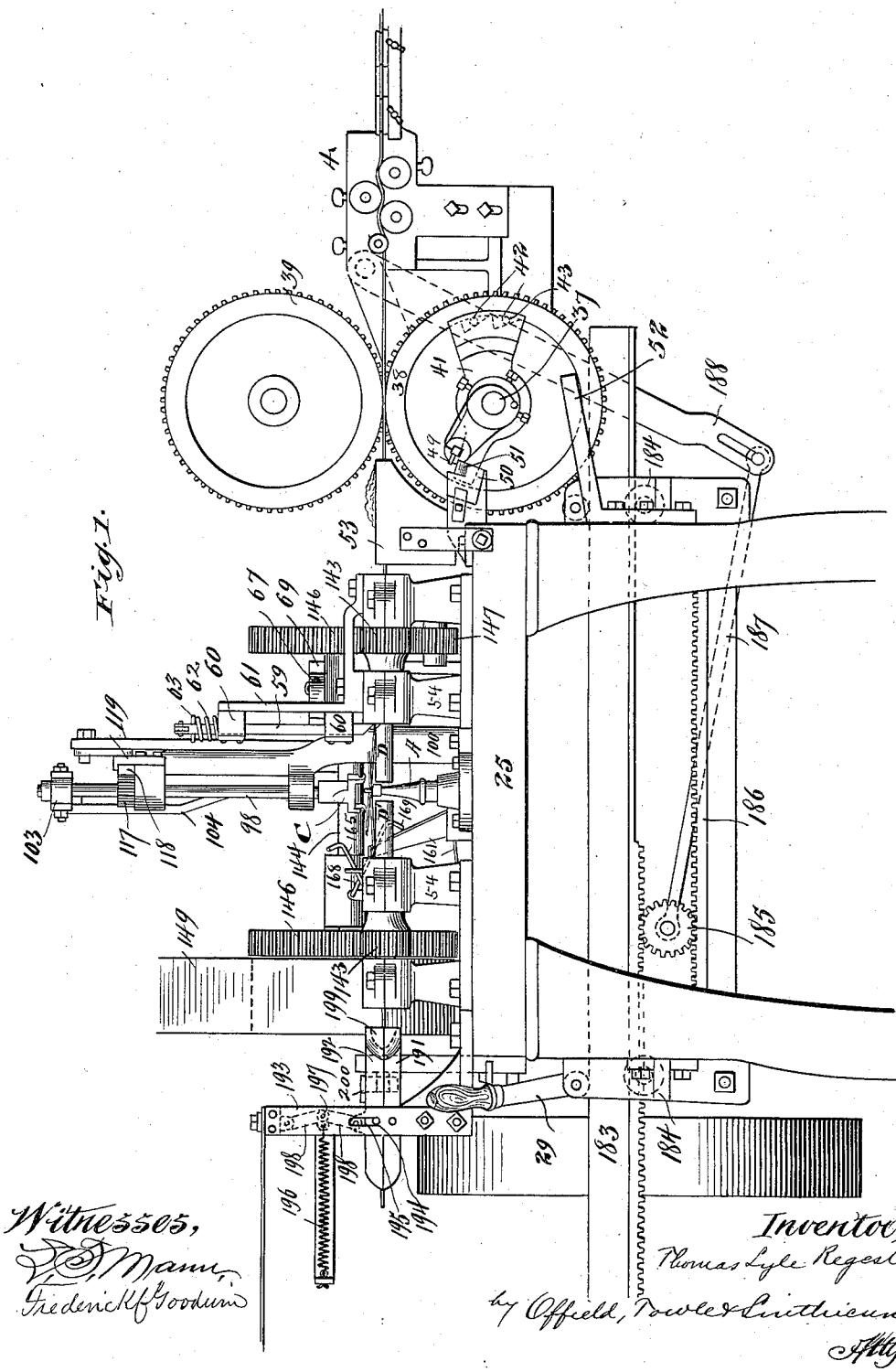
Figure 2:
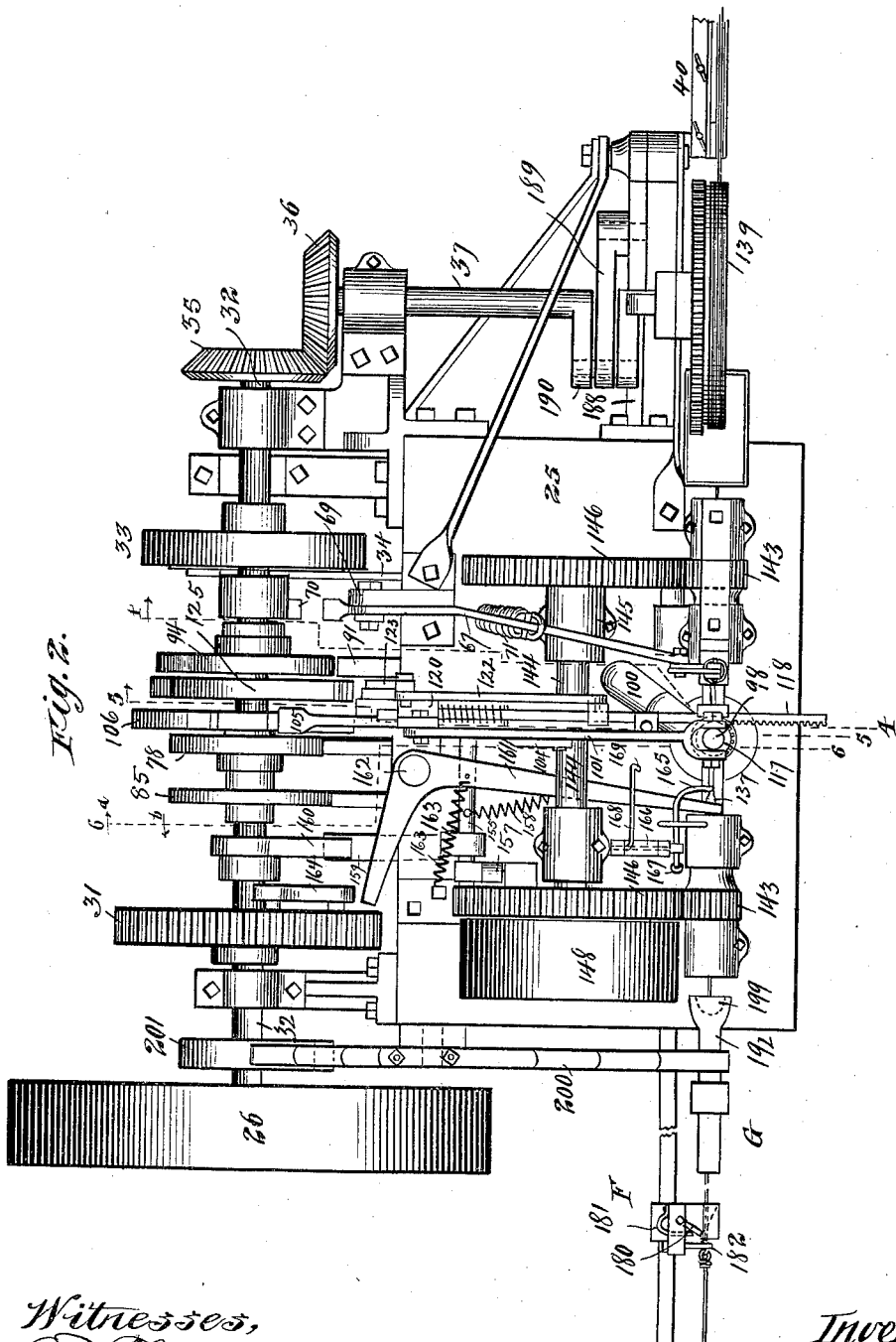

In the accompanying drawings, Figure 1 is a front elevation of a machine embodying my invention. Fig. 2 is a plan view thereof. Fig. 3 is a rear elevation. Fig. 4 is a detail sectional view taken on the line 4 4 of Fig. 2 and looking in the direction of the arrow. Fig. 5 is a detail sectional view taken on the line 5 5 of Fig. 2 and looking in the direction of the arrow. Fig. 6 is a detail sectional view taken on the line 6 6 of Fig. 2 and looking in the direction of the arrow $a$. Fig. 7 is similar view taken on the same line, but looking in the opposite direction or in the direction of the arrow $b$. Fig. 8 is an enlarged detail sectional view of the coiler-clutch shown in Fig. 7. Fig. 9 is an enlarged detail view, in central vertical section, through the coilers, a portion of their associated mechanism being shown in elevation. Fig. 10 is a plan view of the same parts. Fig. 11 is a vertical sectional view through the post, the coiling-pin being shown in elevation and the stripper being shown in dotted lines. Fig. 12 is an end elevation of one of the coilers, illustrating the relation thereto of the stripper. Fig. 13 is a detail plan of the same parts. Fig. 14 is a detail elevation of the clutch for drawing out the completed check-row wire. Fig. 15 is a detail sectional view of the feed-clutch. Fig. 16 is a detail sectional view of a portion of the mechanism shown in Fig. 6. Fig. 17 is an end elevation of one of the coilers. Fig. 18 is a detail sectional view of the upper end of the post, showing the wires in place in the grooves therein. Fig. 19 is a detail plan view showing the wires in the condition in which they exist after the formation of the loops and before the alinement of the wires or centering of the loops. Fig. 20 is a similar view showing the conditions of the loops after being centered to aline the wires, and Fig. 21 is a perspective view showing the completed loops and coils united to form a joint or button of the check-row wire.

The various mechanisms which constitute the apparatus are in the main mounted and supported upon a suitable table 25, and motion is imparted to most of these mechanisms by means of a pulley-wheel 26, which is adapted to receive a belt driven from any suitable source of power. The pulley-wheel 26 is loosely mounted on a shaft 27, connection between said pulley and shaft being made or broken by means of a clutch 28, controlled by a lever 29, extending to the front of the machine within convenient reach of the operator.

On the shaft 27 is secured a pinion 30, which meshes with a gear-wheel 31 on a shaft 32, which carries various cams, whereby the movements of the greater portion of the mechanism of the apparatus are controlled. In order to provide means for actuating the various mechanisms when the power is disconnected from the apparatus, so as to enable the operator to set the machine in any desired position, I provide upon the shaft 32 a clutch 33, operated by a foot-lever 34, as indicated in detail in Fig. 4 of the drawings. In the construction shown said clutch consists of a wheel secured on the shaft and having a lateral flange $33^a$ and a disk $33^b$, to which the lever 34 is attached and which has recesses $33^c$, with inclined walls, in which are located rollers $33^d$. When the foot-lever 34 is depressed, these rollers will be pinched between the disk and flange and will rotate the shaft 32 in a forward direction. When the foot-lever is released, it is returned to its normal or raised position by a spring $34^a$, the rollers being released from between the disk and flange, and the disk returning without rotating the wheel or its shaft 32.

The shaft 32 is provided at one end with a beveled gear 35, which meshes with a similar gear 36 on the shaft 37, which extends toward the front of the machine and serves to actuate the feed-rollers. These latter (indicated at 38 and 39) are provided with intermeshing gear-teeth, so as to rotate in unison, and are provided with grooves to receive between them the wire to be operated upon, which is led to them through straightening devices 40 of an approved construction. The lower feed-roller 38 is loose on the shaft 37 and is driven from said shaft by means of a clutch-arm 41, also loose on said shaft, and having peripheral recesses 42, with inclined walls, and containing rollers 43, which when the clutch-arm is rotated in a forward direction will bind between said clutch-arm and the rim of the wheel and cause said wheel to rotate along with the clutch-arm.

44 indicates an arm which is secured to the shaft 37 and which is provided at its outer end with a pin 45, which is normally thrust inward toward the clutch-arm and wheel 38 by means of a spring 46. This pin is adapted when thus thrust inward to engage with an arm 47, attached to the clutch-arm and projecting from the hub thereof in an opposite direction to that in which the clutch-arm proper extends. The clutch-arm proper, 41, is provided with a groove 48, through which the pin 45 may pass without engaging the said clutch-arm. The pin 45 is provided with a laterally-projecting finger 49, and there is mounted on the frame of the machine a fixed cam 50, having an incline 51 arranged in the path of the finger 49. There is also mounted on the frame a fixed stop 52, arranged in the path of the clutch-arm 41.

This portion of the apparatus operates in the following manner: The normal position of the clutch-arm 41 is that in which it is at rest against the stop 52. The arm 44 rotates continuously along with the shaft 37, its pin 45 passing by the clutch-arm 41 through the groove 48 therein and engaging the rear edge of the arm 47, whereupon said arm 47 and the clutch-arm 41 rotate along with the arm 44, carrying with them the feed-roller 38, which actuates its companion roller 39. This motion of the feed-rollers continues until the finger 49 of the pin 45 engages with the incline 51 of the fixed cam 50, whereupon said pin is moved outward sufficiently to clear the arm 47. The clutch-arm is then disengaged from the feed-roller 38 and the motion of the feed-roller ceases, the clutch-arm returning to its normal position and the arm 44 continuing to rotate until this pin again engages the rear edge of the arm 47, whereupon the action of the feed-rollers is repeated. An intermittent or step-by-step feed is thus provided.

The feed mechanism just described feeds the wire forward through an oiling-box 53 and the looping and coiling mechanisms. The former or looping mechanism consists, essentially, of a post A, a looping-pin B, and a revolving looper C, while the coiling mechanism consists of two coilers D and D', arranged on opposite sides of the post with their axes in line with each other and mounted so as to revolve in standards 54 on the table 25.

The coiler D consists of a hollow sleeve or mandrel through which the wire is fed, and which contains a die or guiding-block 55, having a passage 56 for the wire, which, when said guiding-block is in its normal position and the wire is being fed therethrough, extends in an upwardly-inclined direction toward the post A and serves to deflect or incline the end of the wire upward as it is fed forward in the manner shown in Fig. 9, so as to cause the same to be fed over the top of the said post A. This passage also has a slight rearward inclination, so as to cause the incoming wire to pass to the rear of the pin B. At the point where the guiding-block or die 55 terminates, the sleeve 57 of the coiler D is provided with a notch or cut-away portion 58 in that part thereof which is its upper side when said sleeve is stationary in its normal position. This is for the purpose of receiving the cutting-knife 59, which latter has its shank mounted to slide vertically in guides 60, supported by a standard 61. A spring 62, mounted on the shank of the cutter 59 and bearing against one of the guides 60 and a pin 63 in the shank, tends to force the cutter normally upward, so as to clear the sleeve of the coiler. The cutter is connected at its upper end by a pin 64 to a link 65, which is slotted at 66 to receive said pin 64. The link 65 is pivotally connected to one end of a lever 67, which latter is pivotally mounted between its ends, as shown at 68, to a standard 69, extending upward from the table. The rear end of the lever 67 is arranged in the path of a cam arm or finger 70, secured on the shaft 32, and the forward end of said lever 67 is drawn forcibly downward by means of a spring 71 and held normally in this position against a suitable stop, which in the present instance is provided by one of the bearing-standards or pillow-blocks of the coiler-actuating shaft hereinafter referred to.

It will be seen that when during the rotation of the shaft 32 the cam-arm 70 comes in contact with the rear end of the lever 67 said lever is thereby so actuated as to lift its front end, thereby carrying the cutter 59 upward, and when the cam-arm 70 has passed clear of the rear end of said lever 67 the spring 71 draws the front end of said lever forcibly downward until it is arrested by the stop. The inertia of the cutter 59 is sufficient to cause it after the arrest of the movement of the lever 67 to continue on its downward path and sever the wire by a shearing cut across the face of the die or guide-block 55. As soon as the cut is completed the spring 62 immediately draws the cutter up again into the position shown in Fig. 4, clear of the coiler-sleeve and of the path of the wire.

The post A is provided in its upper face or top with two parallel transverse grooves 72, as shown in detail in Figs. 10 and 18, and is mounted in a bearing 73 in the table 25, in which bearing it is capable both of a vertical and of a rocking or limited rotary motion. The vertical motion is controlled by a lever 74, which is pivoted between its ends at 75 beneath the table and which has its forward end extended below the lower end of the post A, where it is forked, as shown at 76, for the passage of the pin B. The front end of the lever 74 is provided with a spring 77, by means of which the rear end of said lever is held against a cam 78 on the shaft 32. This cam holds the post normally in a raised position; but it is provided with a depressed or cut-away portion, (shown in dotted lines in Fig. 6 of the drawings,) whereby when during the rotation of the shaft said cut-away portion comes opposite the rear end of the lever 74 the spring 77 is permitted to draw down the front end of said lever, and thereby lower the post A in its bearing 73. A shoulder 79 on said post comes in contact with the top of the bearing 73 and limits this downward motion of the post.

The rocking motion of the post is provided for by means of a crank or arm 80, which is secured to the lower end of said post, as shown in detail in Figs. 9 and 11 of the drawings, and which has pivotally connected to it a rod 81, which is drawn normally forward by means of a spring 82, as indicated in detail in Fig. 6 of the drawings, so as to hold the post A, with its grooves 72, normally parallel with the axes of the coilers, as shown in Figs 9 and 10 of the drawings. The rod 81 is provided at its rear end with a shoulder 83 and with lateral guide-pieces 84, projecting upward from the sides of said shoulder to receive between them the edge of a cam 85 on the shaft 32, as shown in detail in Figs. 6 and 16 of the drawings. The cam 85 is provided with a notch or shoulder 86 and a flattened or cut-away portion 87, immediately behind the same. As the cam 85 rotates along with the shaft 32 the shoulder 86 engages the shoulder 83 of the rod 81 and draws the same rearward against the action of the spring 82, thereby imparting a slight movement of rotation or a rocking movement to the post A by means of the crank or arm 80. This movement may be limited by means of a set-screw 88, which extends through the rod 81 toward the cam 85 and which by its engagement with the flattened portion 87 of said cam will throw the shoulders 86 and 83 clear of each other, and thereby permit the spring 82 to return the rod 81 and post A to their normal positions. The extent of this movement may obviously be regulated with great nicety by adjusting the set-screw 88, so as to project to a greater or less extent.

The pin B has a vertical movement, partly in unison with and partly independent of that of the post A. To this end the pin B extends centrally upward through the post, so as to normally project some distance above the same, and is provided within said post with a shoulder 89 or enlargement which engages with a similar shoulder or enlargement 90 on the interior of the post, which rests upon said shoulder 89 of the pin. At its lower end the pin B is connected to the front end of a lever 91, which is pivoted between its ends, as shown at 92, underneath the table, and which has connected to it a spring 93, which forces the front end of said lever, and consequently the pin B, normally upward. This spring also serves to hold the rear end of the lever 91 in contact with a cam 94. (Shown in dotted lines in Fig. 5 of the drawings.) The body portion of this cam is circular and serves to hold the pin B normally in a raised position; but said cam is provided with a projecting portion 95, which by its contact with the rear end of the lever 91 serves to depress the pin B and hold it depressed for some little time. After the raised portion 95 of the cam 94 has passed clear of the rear end of the lever 91 the spring 93 returns said lever to its normal position, and thereby raises the pin B to its normal elevated position.

The looper C is preferably constructed in the form shown in the drawings, consisting of a cross-head 96, having at its opposite ends hooked fingers 97, which are adapted to engage the ends of the wires and twist the same around the pin B in order to form the loops. For this purpose the said looper is capable of rotary and of vertical motion, and to this end it is mounted upon a shaft 98, which has its axis of rotation in line with the pin B and extending vertically upward therefrom. The shaft 98 is mounted to revolve and move longitudinally in bearings 99 on a standard 100, riding from the table 25. In order to provide for the vertical movement of the looper, there is connected to the upper end of the shaft 98 an arm or lever 101, pivoted at its rear end to a standard 102 on the table and having its forward end pivotally connected to a collar 103, mounted on the upper end of the shaft 98 in such a manner as to permit said shaft to revolve freely within said collar. The lever 101 is connected by a link 104 to the forward end of a lever 105, the rear end of which is held in the path of a cam-wheel 106 by means of a spring 107, connected to the front end of said lever and to the standard 102 and tending to draw the front end of said lever upward, and consequently to hold the looper C in an elevated position.

108 indicates a stop which serves to limit the upward motion of the front end of the lever 105, and consequently the upward motion of the looper, said stop being provided with a set-screw 109, by means of which said limit of motion may be adjusted. The cam-wheel 106 is of such diameter as to the major portion of its circumference as to be out of contact with the rear end of the lever 105, so that during the passage of this portion of the cam-wheel under the rear end of said lever the looper is held at its upper limit of motion out of the way of the wires by means of the spring 107. Beyond this portion of the cam-wheel 106, which is of comparatively small diameter and which is indicated at 110, the cam-wheel 106 is provided with an inclined portion 111 and a raised portion 112, following the same, said inclined and raised portions serving to partially depress the looper and maintain it in such partially-depressed position for a short period of time. Following the portion 112 the cam is provided with a depression or cut-away portion 113, which permits the looper to be partly raised for a brief period of time, and following this depressed portion of the cam is an incline 114, followed by an extended circular portion 115 of greater diameter than the raised portion 112, said incline and raised circular portion serving to depress the looper to its maximum extent and to hold the same thus depressed for a considerable period. The raised portion 115 terminates in a shoulder 116, which extends to the portion 110 of minimum diameter and which permits the looper to be raised to its uppermost position and there held during the remainder of the rotation of the cam.

For the purpose of imparting a rotary motion to the looper, the shaft 98 thereof has splined thereon a pinion 117, through which the shaft may move freely in a vertical direction while it is compelled to rotate along with said pinion. The pinion may be held stationary in any suitable manner to prevent it from moving longitudinally with the shaft, and in the present instance I have shown the pinion as mounted upon the upper bearing 99 of the standard 100. In order to impart a rotary motion to the pinion 117, I employ a rack 118, adapted to slide horizontally in a suitable guide 119 on the standard 100 and in a similar guide 120 on the standard 102. This rack is normally thrust forward by means of a spring 121 and is actuated in a longitudinal direction by means of a link 122, connecting said rack with the upper end of a lever 123, pivoted near its lower end to a lug 124 on the standard 102 and having its lower end below said pivot arranged in the path of a cam-wheel 125, against which it is held by means of a spring 126, connected with said lever above its pivot and extending thence to the standard 100 or to some other suitable point of attachment.

127 indicates a set-screw passing through a suitable lug 128 (shown in dotted lines in Fig. 5 of the drawings) and serving as an adjustable stop to limit the forward motion of the arm 123, and consequently to determine the position of the looper when the same is in its normal position of rest, which is when the rack 118 has been moved to its forward limit of motion. The cam-wheel 125 for about one-half of its circumference is circular in form, as indicated at 129, and during the contact of this portion of the cam with the lower end of the lever 123 the rack 118 is stationary and the looper C does not rotate. Following this circular portion of the cam is an incline 130, which, coming in contact with the lower end of the lever 123, causes a rearward motion of the rack. This incline is followed by a second circular portion of the cam 131, during the passage of which by the lever 123 the rack and looper are stationary. This is followed by an incline 132, which imparts a rearward movement to the rack, and consequently a rotation to the looper through about three-quarters of a circle. This incline 132 is followed by a depression 133, which permits a forward movement of the rack and a consequent reverse movement of the looper back toward its original position for a slight distance. The depression 133 is followed by an incline 134, which causes a rearward movement of the rack and a partial rotation of the looper sufficient to bring the same into a position transverse to the line of feed of the wire, and the incline 134 is followed by a circular portion 135, which maintains the looper in this transverse position, holding the rack stationary until the lever 123 is reached by a shoulder 136 on the cam-wheel 125, thereby allowing the rack-bar to move forward to the limit of its motion, and thus return the looper to its normal stationary position.

The coilers, referred to as a whole by the reference-letters D and D', are arranged on opposite sides of the post A and pin B with their axes of revolution in the same line, which is the general line of feed of the wire through the machine. Each coiler consists of a sleeve 57, mounted to rotate in suitable bearings on the top of a standard 54, the coilers being fixed, however, so as to have no movement longitudinally in the direction of their axes of rotation toward and from each other. The sleeves 57 are slotted radially as to those portions thereof which extend from the bearings inward toward the post, as indicated at 137, these slotted portions of the sleeves being the portions which are normally uppermost or, in other words, the portions which are uppermost when the coilers are at rest. Each sleeve 57 carries at its extremity adjacent to the post A a coiling-disk proper, 138, which is provided with a central aperture 139 for the passage of the wire and a radial slot 140, extending from said aperture to the periphery of the disk, where it communicates with and forms a continuation of the slot 137 in the sleeve 57. (See Fig. 17.) Each coiling-disk has a rabbeted portion or recess 141 in its face surrounding the aperture 139 and slot 140 and forming a space to receive the coiled portion of the wire which is formed by the rotation of the coiler. A segment of the face of the disk, which is that portion normally uppermost and lying on each side of the slot 140, is rabbeted or cut away to form the shoulders 142 lying on each side of the slot 140, these projecting shoulders being the operative parts, which by their contact with the wires serve to coil the same. In order to impart a rotary motion in opposite directions to the coilers, the sleeves 57 are provided with the pinions 143, secured thereon on the outer sides of the standards 54. 144 indicates a shaft mounted in suitable bearings 145 on the table 25 and having gear-wheels 146, which serve to drive the coilers. The gear-wheel 146 which drives the coiler D' meshes directly with the pinion 143 thereof; but that gear-wheel 146 which drives the coiler D has interposed between it and the pinion 143 an idle pinion 147, so that when the shaft 144 is rotated the coilers D and D' are simultaneously rotated at the same speed, but in opposite directions. One of the standards or bearings 145 of the shaft 144 forms the stop hereinbefore referred to, which limits the downward motion of the lever 67, which operates the cutter.

Intermittent rotary motion is imparted to the coiler-actuating shaft 144 by means of the following mechanism:

148 indicates a wheel mounted loosely on the shaft 144 and continuously rotated thereon by means of power from any suitable source. In the present instance I have shown this wheel as a pulley-wheel driven by means of a belt 149 from the line-shaft or other suitable source of power, although it might obviously be driven from the main shaft 32 of the machine either by gearing or belting. This wheel carries or has formed with it a disk or plate 150, provided with a plurality of apertures 151 and lying immediately adjacent to one of the gear-wheels 146. (See Fig. 8.) This gear-wheel carries a spring-controlled pin 152, mounted in said gear-wheel in such a position as to engage with any one of the apertures 151 which may be opposite the same when said pin is free to move under the impulse of its controlling-spring 153. The pin 152 is provided with a lateral projection or finger 154, and there is mounted in suitable bearings on the table 25 a rock-shaft 155, which carries an arm 156, having a beveled or inclined end 157, which is normally held in the path of the projection or finger 154 by means of a spring 158. The rock-shaft 155 is provided with a second arm 159, which lies in the path of a cam-arm 160, secured on the shaft 32. When the parts are in their normal or stationary position, as shown in Fig. 7 of the drawings, the finger or projection 154 rests upon the arm 156, and the pin 152 is thereby held out of engagement with the disk or plate 150, so that the wheel 148 revolves freely on the shaft 144 without causing said shaft to revolve. When the cam-arm 160 comes in contact with the arm 159, the arm 156 is withdrawn from under the finger or projection 154, and the spring 153 forces the pin 152 against the plate 150, so that as the latter revolves one of its apertures 151 will come opposite said pin 152 and the pin will enter said aperture, thus connecting the gear-wheel 146 with said disk or plate and with the revolving wheel 148, and thereby causing the shaft 144 to revolve. Rotary motion is thus imparted to the coilers, which preferably make four revolutions during one revolution of the shaft 144. As the shaft 144 approaches its initial position, the cam-arm 160 having passed clear of the arm 159, the arm 156 has been again thrown into the path of the projection 154 by the spring 158, and said projection will ride upon the beveled end 157 of the arm 156, and the pin 152 will thereby be withdrawn from the aperture 151 with which it is engaged, thus disconnecting the gear 146 from the wheel 148 and arresting the motion of the coiler-actuating shaft 144 and of the coilers.

In order to insure a proper engagement of the wires with the grooves or seats in the upper end of the post A and in order to insure their assuming and retaining a properly-inclined position relatively to each other, I employ the following devices: 161 indicates a bell-crank lever mounted upon an inclined axis 162 on the rear of the table and having its forward end extending upward at an angle, as indicated more particularly in Figs. 1 and 7, the normal position of the forward or operative end of said lever being above the sleeve 57 of the coiler D' at the point where said sleeve enters its bearing 54, the lever being held normally in this position by means of a spring 163. It results from this normal position of the lever that the severed end of the wire already operated upon, which may be termed the "outgoing" wire, passes underneath said lever. The lever 161 is actuated by means of a cam 164, secured on the gear-wheel 31, in the path of which cam the rear end of said lever is held by means of the spring 163. When this cam comes in contact with the rear end of said lever, the front end thereof swings laterally over the top of the severed end of the wire already operated upon, moving over the same toward the post A and serving to force the same down into its groove 72 in said post, while at the same time it causes the free end of said wire, which extends outward beyond the opposite side of said post, to assume an upwardly-inclined position outward from said post, as indicated more particularly in Fig. 9 of the drawings. The severed end of the wire which is being fed into the machine, which may be termed the "incoming" wire, is similarly forced down into its groove 72 in the post A by means of an arm 165, which is carried by a hinged upright or frame 166, pivoted at its lower end to the table 25, and held normally in a vertical position with the arm 165 above and clear of the wire by means of a spring 167. This hinged upright or frame is provided with an arm 168, having thereon a terminal finger or hook 169, which is located in the path of the lever 161, so that when this lever swings across the wire toward the post A it will engage the hooked finger 169 of the arm 168 and will swing the hinged upright or standard 166 inward and downward toward said post, carrying with it the arm 165, which extends over that portion of the newly-severed end of the wire just fed into the machine, which projects beyond the post A, and by bearing down on this projecting end said arm 165 forces said wire downward into its groove or seat 72 and holds the same firmly in that position. When the cam 164 has passed clear of the rear end of the lever 161, the spring 163 returns said lever to its normal position clear of the free ends of the wire, and upon the return movement of said lever 161 the spring 167 returns the hinged upright or frame 166 to its normal position, as shown in the drawings, thus carrying the arm 165 upward away from and clear of the wire.

In order to remove the loops from the pin B after the looping and coiling operation, I employ a stripper E, which is shown in detail in Figs. 11, 12, and 13 of the drawings. This stripper consists of a body portion or finger 170, which is adapted to pass between the wire and the first coiler D. The lower edge of this finger 170 is inclined, as shown at 171, and this incline rests upon one of the shoulders 142 of the coiling-disk 138 of the coiler D when the stripper is advanced into operative position. As the stripper is moved forward over the coiling-disks the incline 171 by reason of its contact with the shoulder 142 causes an upward motion of the stripper, which carries upward with it the looped wires, and thereby clears them of the end of the pin. The finger 170 is provided on its upper portion with a shoulder or projection 172, which by its engagement with the wire as the stripper advances moves the same bodily and laterally toward the front of the machine, so as to bring it in front of the pin B. In order to permit the upward movement of the stripper, it is connected to the standard 173, which carries it by means of a shank 174 on the body or finger 170, which shank extends up into a recess 175 in the standard 173 and is movable vertically therein. This vertical movement is guided and limited by means of a pin 176 on the shank, which extends into a slot 177 in the standard and which serves to prevent the stripper from dropping out of the standard and at the same time to prevent its rotation relatively to the standard, thereby holding it in proper alinement relatively to the post and coilers. A spring (not shown) may be employed to depress the stripper, if desired.

In order to simplify the mechanism of the apparatus, the standard 173 is connected to the rack 118 and moves therewith, so that the stripper E is operated by the cam 125, the lever 123, with its spring 126, and the connecting-link 122 and rack 118. The connection between the stripper-standard and rack is an adjustable one, so as to permit the proper adjustment of the stripper relatively to its coöperating parts. The incline 130 of the cam 125 serves to withdraw the stripper from the post and coilers preparatory to the operation of looping and coiling the wires, and the stripper is held in this withdrawn position out of the way of the wires and the mechanism operating thereon by means of said cam 125 until the shoulder 136 of said cam reaches the lever 123, whereupon the spring 126 will move the stripper forward and in the manner already described strip the loops from the pin.

In order to withdraw the wire from the machine after it has been properly looped and coiled, I employ a clutch F, which consists of a standard 178, carrying at its upper end a fixed jaw 179 and a hinged or pivoted jaw 180, which latter is held by a spring 181 against the fixed jaw at an angle inclined in the direction of movement of the wire. The result of this inclination is that as the clutch is moved away from the machine the wire will be gripped between the jaws thereof and carried along with the clutch, while when the clutch is moved toward the machine the wire will pass freely therethrough, the movable jaw swinging freely away from the fixed jaw to permit this passage of the wire. A transverse pin 182 above the wire prevents it from slipping out of the clutch in an upward direction, while the body of the standard prevents the wire from passing out of the clutch in a downward direction. The standard 178 is mounted upon a sliding rack-bar 183, mounted to move longitudinally in suitable guides 184, and motion is imparted to it by means of a pinion 185, which meshes with said rack-bar and with a fixed rack 186, between which and the rack-bar 183 said pinion is located. The pinion 185 is mounted on and carried by one end of a pitman or connecting-rod 187, the other end of said pitman or connecting-rod being connected to the lower end of a vibrating arm or lever 188. The upper end of the arm 188 is pivoted to a suitable support on the frame, and a vibratory motion is imparted to said arm by means of a pitman or connecting-rod 189, pivoted at one end to the said vibrating arm and connected at the other end to a crank 190 on the shaft 37. The connection between the rod 187 and arm 186 is an adjustable one, so as to vary the throw of said arm, and consequently the extent of the movement imparted to the clutch F. It will be seen that by reason of the mechanism employed the motion imparted to the clutch F is double that of the lower end of the vibrating arm 188, so that a greatly-increased range of motion of the clutch is obtained without a corresponding increase in the range of motion and dimensions of the operating parts.

In order to maintain a tension upon the wire to prevent its being drawn too far or entirely out of the machine by the operation of the clutch F and the inertia of the reel on which the wire is coiled, I provide between said clutch and the coiling and looping mechanism a tension device G, which consists of two separable members 191 and 192, between which the wire passes and is held during its passage by a variable spring-pressure. The lower member 191 of the tension device is fixed, while the upper member moves vertically between suitable guideways or supports 193, it being provided with pins 194, which enter slots 195 in said ways. The yielding member 192 is normally held against the fixed member 191 by means of a spring 196, which is connected to the knuckle 197 of a pair of toggle-levers 198, these latter being respectively connected at their ends to the movable member 192 and to the upper end of the guides 193. The two members of the tension device have a flaring mouth 199 to permit the entrance between the members of the coils and loops which form the buttons of the check-row wire, and the spring 196 being comparatively weak the said spring and the toggles will yield to permit the member 192 to move upward as each button is drawn between the members of the tension device. After the wire has been drawn out, however, to the proper extent the movable member 192 of the tension device is firmly clamped and held against the fixed member thereof, so as to positively clamp the wire between said members by means of a spring-arm 200, the forward end of which extends over the upper or yielding member 192 of the tension device, while its rear end is arranged in the path of a cam 201 on the shaft 32. When the projecting part of this cam comes in contact with the rear end of the spring-arm 200, it forces the front end firmly down upon the yielding member of the tension device, and, clamping the wire firmly within the tension device between the two parts thereof, it prevents the wire from being drawn too far or entirely out of the machine by reason of the inertia of the movement imparted to it by the clutch F or the receiving-reel.

Having thus described in detail the construction of the apparatus, I will now proceed to describe its operation as a whole.

The wire to be operated on is drawn from a suitable reel and after being made into check-row wire may be wound in its completed state upon a similar reel at the other end of the machine. The wire is first led through the machine to the clutch F, being passed through the straightening devices, feed-wheels, oil-box, coilers, and tension device, and the machine may be set to the proper position for commencing operations by means of the foot-power clutch on the shaft 32. Assuming that a knot or button has been formed in the wire and that the clutch F has moved to the outward limit of its motion, drawing the wire with it through the machine, the operation proceeds as follows: The arm or finger 70 actuates the cutter 59 in the manner hereinbefore described, lifting the same and allowing it to drop with sufficient force to sever the wire, the cutter being immediately lifted by its spring out of the path of the wire after cutting the same. The severed end of the outgoing wire lies in the front groove 72 of the post A in the manner shown in Figs. 9 and 10 of the drawings. The pin 45 then engages the arm 47 of the clutch-arm 41 and rotates the feed-wheels, thereby feeding forward the wire from the coil, the incoming end of the wire being directed, by means of the passage 56 in the guiding-block 55, in an upwardly and slightly rearwardly inclined direction, so as to cause the said wire to pass over the top of the post A and lie in the rear groove 72 thereof on the opposite side of the pin B from that on which the end of the outgoing wire lies. During the forward feeding of the incoming wire the cam 164 comes in contact with the rear end of the bell-crank lever 161 and causes the forward end of the same to move laterally over the severed end of the outgoing wire and under the severed end of the incoming wire, thereby forcing the end of the outgoing wire firmly into its seat on the post A and insuring an upward inclination of the projecting end of said wire on the opposite side of the post, while at the same time it insures the upward inclination of the projecting end of the incoming wire. This lateral movement of the lever 161 also brings down the arm 165, through the mechanism already described, and insures the proper seating of the incoming wire in its groove in the top of the post A. Prior to these operations the incline 130 of the cam 125 has, through the medium of the lever 123 and link 122, moved the rack 118 rearward, and thereby withdrawn the stripper E from the path of the incoming wire. The incoming wire having been fed forward to a sufficient extent, the pin 45 comes into contact with the fixed cam 50 and the clutch is disengaged from the feed-rollers, thereby arresting the feed. The incline 111 of the cam 106 then comes into contact with the rear end of the arm 105 and through the connecting mechanism described depresses the looper C into proper position, so that when rotated its fingers 97 will engage the upwardly-inclined ends of the wires as they rest upon the post A. While the looper is held in this depressed position by means of the circular portion 112 of the cam 106, the incline 132 of the cam 125 engages the lever 123 and moves the rack 118 rearward, thereby imparting to the looper-shaft 98 and to the looper a movement of rotation amounting to about three-quarters of a revolution. By reason of this rotary motion of the looper the hooked fingers thereof engage the ends of the wires and coil them around the pin B to form the loops, as indicated in Fig. 19 of the drawings, said loops being interlocked owing to the opposite inclinations and consequent overlapping of the wires. During this formation of the loops the shoulder 86 of the cam 85 engages the rod 81, and thereby imparts a slight rotary motion to the post A. This motion of the post, by reason of the engagement of the wires in the grooves 72 thereof, serves to center the loops and bring the two wires into alinement with each other, as shown in Fig. 20 of the drawings. After the loops have been formed and centered the rod 81 is disengaged from the cam 85 and the post A is returned to its normal position, and the cam 125, by means of the depression 133, gives to the looper a slight rotation backward or in the reverse direction from that in which it moved in forming the loops, thereby serving to clear the hooked ends of the looper from their engagement with the ends of the wire. At the same time the cam 164 passes clear of the lever 161 and said lever and the arm 165 return to their normal positions. The cam 106 then, by means of its depressed portion 113, permits the looper and its shaft to be moved upward clear of the wires, and the cam 125, by means of its incline 134, rotates the looper-shaft and looper so as to cause this latter to assume a position transverse to the wire, with its fingers on opposite sides of the path thereof. As soon as the looper has been given this position the cam 106, by means of its incline 114, depresses the looper to its maximum or lowest position, and at the same time the cam 78 presents its depressed or cut-away portion to the lever 74, and by means of the spring 77 the post A is moved downward, carrying along with it the pin B and the looped wires, which are thus brought into line with the axis of rotation of the coilers, in which position they are held and prevented from slipping off the pin by means of the looper. At this point of the operation the arm 160 of the shaft 32 comes in contact with the arm 159 on the rock-shaft 155 and withdraws the arm 156 from engagement with the pin 152, permitting this latter to engage the continuously-rotating disk 150, and thereby starting the coiler-actuating shaft. The coilers are thereby rotated in opposite directions and their shoulders 142 respectively engage the projecting ends of the looped wires and coil the same around the bodies of the wires, thereby forming the completed structure shown in Fig. 21. After the rotation of the coilers is automatically arrested by means of the mechanism hereinbefore described the cam 106 presents its shoulder 116 to the lever 105, and thereby permits the spring 107 to lift the looper and looper-shaft to their upward limit of motion, while at the same time the cam 78 operates upon the lever 74 to lift the post A, the pin B moving up along with it, and thereby lifting the looped and coiled ends of the wires above the coilers. While these parts are held in this elevated position, the raised portion 95 of the cam 94 comes in contact with the lever 91, and thereby depresses the pin B in order to disengage the same from the loops which have been formed around it. At the same time the cam 125 presents its shoulder 136 to the lever 123 and moves the rack 118 forward, carrying with it the stripper E, which, as its inclined lower surface rides over the shoulder of the coiler with which it engages, is moved upward, carrying with it the looped and coiled wires and insuring their disengagement both from the pin and from the post. At the same time the shoulder 172 of the stripper comes into contact with the wire and carries the same over into a position in front of that of the pin B, so that the outgoing wire will lie on the front side of said pin and in the front groove 72 of the post A. The operation of looping and coiling the ends of the wires to form the knot has thus been completed. During these operations the clutch F has been moving backward toward the machine; but as soon as the pin B has been withdrawn clear of the loops and the stripper has raised the knot into a position ready to be withdrawn the clutch F starts to move away from the machine and, engaging a preceding knot, draws the wire out of the machine, this movement continuing until the predetermined amount of wire has been drawn forward, whereupon the movement of the clutch away from the machine ceases. At this moment the cam 201 on the shaft 32 engages the rear end of the spring-arm 200 and forces the movable member 192 of the tension device firmly down upon the fixed member, thereby clamping the wire between said members and preventing the wire from being drawn too far either by its own inertia or by that of the reel upon which the completed check-row wire is wound. The clutch F then starts on its return journey toward the machine, the pin B having in the meanwhile returned to its normal or raised position, the cutter severs the wire, and the operations just described proceed as before.

I claim—

1. In a machine for making check-row wire, the combination, with two coilers rotatable in opposite directions at a fixed distance from each other, of a vertically-movable oscillating looper, and a loop post and pin located between the coilers and vertically movable independently of each other, substantially as described.

2. In a machine for making check-row wire, the combination, with two coilers arranged in the same axial line at a fixed distance from each other and means for intermittently rotating said coilers in opposite directions, of a vertically-movable oscillating looper and means for actuating the same, a loop post and pin located between the coilers, and means for imparting a vertical movement to said post and pin independently of each other, substantially as described.

3. In a machine for making check-row wire, the combination, with the coilers and the looper, of a post and a pin mounted therein, located between the coilers and in line with the looper, said post and pin being vertically movable independently of each other and said post being capable of oscillation, substantially as described.

4. In a machine for making check-row wire, the combination, with the coilers and looper and means for actuating the same, of a post and a pin mounted therein, located between the coilers and in line with the looper, and means for imparting a vertical movement to said post and pin independently of each other and an oscillating movement to said post, substantially as described.

5. In a machine for making check-row wire, the combination, with the coilers and the looper, of a post and a pin mounted therein, located between the coilers and in line with the looper, said post and pin being vertically movable independently of each other and said post being capable of oscillation, substantially as described.

6. A machine for making check-row wire comprising, in combination, two coilers arranged in the same axial line at a fixed distance from each other, a vertically-movable oscillating looper, a vertically-movable looping post and pin located between the coilers and in line with the looper, a main or driving shaft, and automatic mechanism connected with said main or driving shaft for intermittently rotating the coilers and for actuating the looper and looper post and pin, substantially as described.

7. In a machine for making check-row wire, the combination, with the coilers and looper, of a post and a pin projecting centrally above the same, said post being provided with grooves on opposite sides of said pin to receive the ends of the wire and being capable of oscillation and vertical movement, and said pin being capable of independent vertical movement, and means for actuating said post and pin, substantially as described.

8. In a machine for making check-row wire, the combination, with the coilers, the looper and the pin around which the loops are formed, of a vertically-yielding stripper having a cam-incline in contact with one of the coilers and a projection to engage the wire, and means for reciprocating said stripper, substantially as described.

9. In a machine for making check-row wire, means for intermittently feeding in the wire, comprising two operatively-connected feed-wheels, a shaft on which one of said feed-wheels is loosely mounted, an arm loosely mounted on said shaft and provided with a clutch to engage the wheel, a second arm secured on said shaft and adapted to engage said loosely-mounted arm, and means for disengaging said fixed and loose arms at each revolution of the shaft, substantially as described.

10. In a machine for making check-row wire, means for intermittently feeding in the wire, comprising two operatively-connected feed-wheels, a shaft on which one of said wheels is loosely mounted, an arm loosely mounted on said shaft and provided with a clutch to engage the wheel, a second arm secured to said shaft and provided with a spring-controlled pin normally adapted to engage the loose arm, and a fixed cam adapted to engage said spring and withdraw it from engagement with the loose arm, substantially as described.

11. In a machine for making check-row wire, means for intermittently feeding in the wire, comprising two operatively-connected feed-wheels, a shaft on which one of said wheels is loosely mounted, an arm loosely mounted on said shaft and provided with a second counterweight-arm to return said first-mentioned arm to a normal position, said counterweight-arm being provided with a clutch mechanism to engage the wheel, an arm fixed on said shaft and adapted normally to engage the loose arm, and means for releasing said engagement at each revolution of the shaft, substantially as described.

12. In a machine for making check-row wire, means for intermittently feeding in the wire, comprising two operatively-connected feed-wheels, a shaft on which one of said wheels is loosely mounted, an arm loosely mounted on said shaft and provided with a clutch to engage said wheel, means for returning said loose arm to a normal position, an arm fixed on said shaft and adapted to engage said loose arm, and means for releasing said engagement at each revolution of the shaft, substantially as described.

13. In a machine for making check-row wire, means for severing the wire, comprising a cutter, a comparatively light spring for forcing said cutter normally upward, a lever having a loose connection with the cutter, a comparatively heavy spring for operating said lever to depress the cutter, and a cam for intermittently actuating said lever, substantially as described.

14. In a machine for making check-row wire, a cutting mechanism comprising a cutting-knife having a shank mounted to slide in suitable ways, a light spring to force said cutting-knife normally upward, a link having a pin-and-slot connection with said shank, a lever pivoted to said link, a heavy spring normally depressing the front end of said lever, and a cam-finger adapted to intermittently engage the rear end thereof, substantially as described.

15. In a machine for making check-row wire, the combination, with a suitable post or anvil and means for crossing the ends of the wire upon the same, of a lever pivoted to swing in a plane substantially parallel with the line of travel of the wire and adapted to depress the outgoing portion of the wire on the outgoing side of the post or anvil, substantially as described.

16. In a machine for making check-row wire, the combination, with a post or anvil and means for crossing the ends of the wire over the same, of an arm adapted to swing across the path of the wire and depress the end of the incoming wire on the outgoing side of the anvil, substantially as described.

17. In a machine for making check-row wire, the combination, with a post or anvil and means for crossing the ends of the wire thereon, of a lever swinging in a plane substantially parallel with the line of travel of the wire and adapted to depress the outgoing wire on the outgoing side of the anvil, and an arm swinging across the line of travel of the wire and adapted to depress the end of the incoming wire on the outgoing side of the anvil, substantially as described.

18. In a machine for making check-row wire, the combination, with an inclined lever adapted to swing over the outgoing wire to depress the same, and a cam for actuating said lever, of a hinged frame carrying an arm with which said lever engages to actuate the frame, a spring to return the frame to its normal position, and a second arm on said frame to swing across the path of the wire to depress the incoming end thereof, substantially as described.

19. In a machine for making check-row wire, a guide for the outgoing wire, comprising a fixed and a movable member having a passage between them for the wire, a light spring for normally holding the two members in contact, a heavy spring, and means for intermittently causing said heavy spring to act upon the movable member, substantially as described.

20. In a machine for making check-row wire, a guide for the outgoing wire, comprising a fixed and a movable member having a passage for the wire between them, a light spring connected by toggle-levers with the movable member, a heavy leaf-spring normally out of contact with the movable member, and a cam for intermittently depressing said leaf-spring upon said movable member, substantially as described.

21. In a machine for making check-row wire, a clutch for engaging the outgoing wire, a longitudinally-movable bar reciprocating in parallel guides for carrying said clutch, whereby said clutch travels in a straight line, and means for actuating said bar, substantially as described.

22. In a machine for making check-row wire, a movable rack provided with a clutch to engage the outgoing wire, a fixed rack parallel therewith, and a vibrating arm having a pitman provided with a pinion which meshes with both racks, substantially as described.

THOMAS LYLE REGESTER.

Witnesses:
F. A. HEAD,
WM. H. BAUMANN.